United States Patent Office
3,806,392
Patented Apr. 23, 1974

3,806,392
BONDING OF RUBBER
Crispin Stuart Leworthy Baker, Douglas Barnard, Maurice Read Porter, and See Toh Mook Sang, Welwyn Garden City, England, assignors to The Natural Rubber Producers' Research Association, London, England
No Drawing. Filed Jan. 19, 1972, Ser. No. 219,181
Claims priority, application Great Britain, Jan. 20, 1971, 2,818/71
Int. Cl. B32b 25/10; C09j 5/00, 5/02
U.S. Cl. 156—306
9 Claims

ABSTRACT OF THE DISCLOSURE

Rubber is adhered during vulcanization to cords, fabrics or solid surfaces of natural or synthetic fibres or steel by using as vulcanizing ingredients nitrosoanilines or nitrosophenols and di- or poly-isocyanates. The nitroso compound and part or all of the isocyanate may be provided in the form of a urethane pre-reaction product of the two which decomposes in the rubber mix during vulcanization. The vulcanization technique is described in British patent specification No. 1,255,646.

---

The present invention relates to the bonding of rubber to other materials, a task which is of importance in various fields of application. Thus, in tyres, it is necessary to achieve adhesion between the carcass rubber and the reinforcing cord plies, which may be of textile (e.g. rayon, nylon or polyester), or of steel. The bonding of rubber to textile fabrics is also important in conveyor belts, V-belts and similar products. In both these fields, the reinforced rubber is subjected to very severe conditions in use.

Adhesion of rubber to nylon and polyester cord is currently achieved by pretreating the cord with a bonding agent. This usually involves dipping the cord in a solution of the agent and then subjecting the coated cord to a heat treatment. Steel cord is either brass plated or treated with chemical bonding agents before use. Adhesion is effected by vulcanizing the rubber under pressure in contact with the treated cord. These existing processes suffer from the disadvantages of requiring a rather complex preliminary treatment of the cord. Also, the bonding strength achieved may not always be adequate for the severe conditions often encountered in use.

The present invention provides a method of effecting adhesion between a natural or synthetic rubber and another material, which method comprises: heating an intimate mixture of the rubber with (a) an aromatic nitroso compound having the formula X—Ar—NO where X is a hydroxyl or a primary or secondary amine group and Ar is an aromatic group, or a precursor thereof, and
(b) a polyfunctional linking agent, or a precursor thereof, under pressure in contact with the material to which it is to be adhered, so as to
 (1) react the rubber with the aromatic nitroso compound, and
 (2) react pendent amino or hydroxyl groups in the resulting product with the polyfunctional linking agent so as to cross-link the rubber and effect adhesion between the rubber and the said other material.

It is an advantage of this invention that chemicals added to the rubber have the twin effects of vulcanizing the rubber and of effecting bonding of the rubber to other materials.

This invention is a modification of that described and claimed in our British patent specification No. 1,255,646. This prior specification provides a system for cross-linking rubber which makes use of nitrosoanilines or nitrosophenols. The principle of the system is illustrated by the following schematic reaction diagram in which two rubber molecules, T, react with the nitroso groups of two nitrosophenol molecules, and the cross-link is completed by reaction of pendent hydroxyl or amino groups with a diisocyanate.

T+ON—Ar—OH+OCN—R—
                        NCO+HO—Ar—NO+T→

(i) T—NH—Ar—O—CO—NH—R—
                      NH—CO—O—Ar—NH—T; or
(ii) T—N(Ar—OH)—CO—NH—R—
                      NH—CO—N(Ar—OH)—T; or
(iii) T—N(Ar—OH)—C—NH—R—
                      NH—CO—O—Ar—NH—T where Ar is an aromatic group and R is the part of a diisocyanate molecule which is other than the two isocyanate groups.

This system is particularly suitable for use with natural rubber. It is, however, also suitable for use with all natural and synthetic rubbers containing unsaturated carbon-carbon linkages, or other groups capable of reaction with aromatic nitroso groups, in appreciable amounts. The system is not suitable for use with those rubbers which contain very low amounts of unsaturation for vulcanization purposes, for example, ethylene-propylene terpolymers and butyl rubber.

The rubber may be filled, e.g. with any of the carbon blacks commonly used for compounding rubber, or not filled according to requirements. The presence or absence of fillers and other compounding ingredients, and the nature of those ingredients when present, is not critical to the present invention.

The material to which the rubber is adhered may be, for example, a natural or synthetic fibre-forming material, such as cellulose, rayon, polyamide or polyester, or glass or steel. The material may be in the form of cord, or of fabric, or may be in the form of discrete particles or of a continuous solid surface which may be uneven so as to facilitate keying.

The material to which the rubber is to be adhered may optionally be pretreated, for example, by one of the methods which are conventionally used when the rubber is to be vulcanized by means of a sulphur system. While such pretreatment may be ineffective when the vulcanizing system of our British patent specification No. 1,255,646 is used alone, the pretreatment can be very effective if vulcanization of the rubber is effected partly by means of a system involving sulphur or sulphur donor, and partly by means of the nitroso system of British patent specification No. 1,255,646.

Under preferred conditions, as described hereinafter, reactions (1) and (2) are performed in close succession, either the aromatic nitroso compound or the polyfunctional linking agent or both being formed in situ in the heated rubber mix.

The nitroso compound is one having a nitroso group, attached to a carbon atom of an aromatic ring, which is capable of adding to an unsaturated rubber molecule, and also having at least one hydroxyl or amine group capable of reacting with the linking compound. One hydrogen atom of the amine group may be replaced, provided that the reactivity of the amine group towards the linking compound is not thereby nullified. Thus, we may use 2-, 3-, or 4-nitrosoaniline or 2-, 3-, or 4-nitrosophenol. We may also use analogues of these compounds in which the aromatic ring carries one or more inert substituents, such as alkyl or aryl groups, or forms part of a fused aromatic ring system, provided that such substituents are not so large and so positioned as to prevent the functional groups of the nitrosophenol or nitrosoaniline from reacting with the linking compound. The preferred nitroso compounds are 4-nitrosoaniline (4NA), 4-nitrosophenol (4NP) and 3-methyl-4-nitrosophenol (4NC).

As linking compounds we prefer to use di-isocyanates, including aromatic compounds, for example, toluene-2,4-di-isocyanate and methylene-bis(4-phenyleneisocyanate), and aliphatic compounds, for example, that sold by E. I. du Pont de Nemours and Co. Inc. under the trademark Hylene W, believed to be 4,4'-di-isocyanato-dicyclohexyl-methane. It is within the scope of the invention to use tri- or polyfunctional compounds as the linking compounds, for example, 4,'4,4''-tri-isocyanato-triphenyl-methane. It is also within the scope of the invention to use higher molecular weight linking compounds, for example, those di-isocyanates sold by E. I. du Pont de Nemours and Company Inc. under the trademark Adiprene.

One disadvantage of the use of di-isocyanates is the fact that they react with water with the eventual formation of carbon dioxide. Natural rubber normally contains about half a percent of water, and more may be formed by the nitroso-addition reaction. In order to avoid loss of di-isocyanate and porosity in the vulcanizate, it may be desirable to add to the rubber mix a drying agent of such a nature and in such an amount to remove the water by reacting chemically with it. Calcium oxide is an example of such a drying agent, and a suspension of calcium oxide in oil sold under the trademark Caloxol is particularly suitable. The use of a drying agent is not a necessity, but it is convenient and cheap and has no attendant disadvantages.

The nitroso compound, or the linking compound, or both, may be formed in situ in the rubber mix, rather than being added per se. The nitroso compound and the linking compound, or their respective precursors, may be added to the rubber mix either together or separately in either order, as is more fully described below. Thorough mixing with the rubber is necessary, and this may be conveniently be achieved by milling, for example, in an open mill or an internal mixer. This cross-linking system may be used either alone, or in conjunction with other systems, e.g., using sulphur, in order to vulcanize the rubber, provided that the other vulcanizing ingredients do not interfere with the nitroso-amine or -phenol, or with the linking compound. The nitroso compound and the linking compound may be added to the rubber before, together with, or after such other fillers, additives, or other compounding ingredients as may be determined for the subsequent application of the vulcanizate by the usual practice of the art.

The separate amounts of the nitroso compound and linking compound added to the rubber will depend upon the degrees of cure and bonding required and can quite readily be determined by methods known in the art. Thus the proportion of aromatic nitroso compound may be from 0.5 to 10, preferably 1 to 5, parts by weight per 100 parts of dry rubber, and the proportion of linking compound may be from 0.5 to 15, preferably 1 to 10, parts by weight per 100 parts of dry rubber. Better cross-linking efficiencies and bonding may be obtained when excess di- or poly-isocyanate is employed over the stoichiometric proportions of e.g., 0.5 mole of di-isocyanate per mole of nitroso compound.

A most important advantage of the system is that vulcanizates prepared according to it are virtually reversion-resistant. Conditions of cure are therefore not critical, provided always that the temperature of cure is sufficient to form in situ any of the nitroso compound and the linking compound which may not have been added to the rubber as such. Curing conditions may, for example, range from 100° C. to 200° C., for from 6 hours to 10 seconds, e.g., from 1 hour to 10 minutes.

The cross-linking efficiency of the system may be significantly improved by the addition of certain metal salts of thiols. Examples of such salts include zinc, cadmium and stannous dithiocarbamates, particularly, dialkyl-dithiocarbamates, dithiophosphates, particularly dialkyldithiophosphates, and zinc benzothiazolethiolate. It is to be expected that salts of other thiols and thio-acids, in which the (divalent) metal atom is directly bonded to sulphur, will also be effective. Among the salts, the preferred ones are zinc dimethyl-, diethyl-, and di-n-butyl-dithiocarbamates on account of their ready availability.

The amount of the metal thio salt used is not critical, and may suitably be from 0.5 to 10, preferably 1 to 6, parts by weight per 100 parts of dry rubber. Generally, 2 parts of the salt are sufficient to give the desired efficiency increase, and there is little to be gained by going above this figure.

The linking compound may be added to a pre-reaction product of the rubber with the nitroso compound. The reaction between natural rubber and 4NA or 4NP may be effected by heating the two together at a temperature of from 50° C. to 250° C., preferably from 100° C. to 200° C., for suitable reaction times, higher temperatures requiring shorter reaction times. When an internal mixer is used, reaction between the rubber and the nitroso compound may conveniently be effected during mixing. Alternatively the reaction may be effected in latex or in wet coagulum according to the methods described in British patent specification No. 1,255,645.

This process suffers, however, from the disadvantage that the linking compound may react too readily with the pendent amine or hydroxyl groups. Thus, when using 4NP as the nitroso compound and toluene-2,4-di-isocyanate as the linking compound, we have found it difficult to avoid premature vulcanization during milling of the linking compound into the pre-reacted rubber.

It may be possible to mitigate this problem either by keeping the temperature down during the mixing of the linking compound with the pre-reacted rubber (e.g. by using a cooled open mill), or by chemically modifying either the 4NP or the di-isocyanate or both so as to reduce the reactivity of the pendent groups towards the linking compound. Nevertheless we prefer to avoid the probem by adding the di-isocyanate in the form of a precursor which decomposes in situ at an elevated temperature to give the linking compound itself. One such compound is the bis phenol adduct of methylene-bis-(4-phenyleneisocyanate), which is commercially available from E. I. du Pont de Nemours and Company Inc. under the trademark Hylene MP. When heated to 150° C. or above, this compound dissociates to give methylene-bis-(4-phenyleneisocyanate). Thus we may mill Hylene MP into a mix containing a pre-reaction product of the rubber with 4NP, taking care that the temperature does not reach 150° C., and subsequently cure for the required length of time at a temperature of at least 150° C., for example, 30 minutes at 180° C.

According to another aspect of the invention, the nitroso compound and the linking compound or a precursor thereof may be milled into the rubber mix together. Under these conditions we find that the premature vulcanization mentioned above is not a problem when 4NP or 4NA is added to the rubber at the same time as a di-isocyanate.

According to another, more preferred, aspect of the system, the pre-reaction product of a nitrosophenol with a di- or poly-isocyanate is added to the rubber. It is thought that the pre-reaction product is formed by a reaction between a di-isocyanate and a nitrosophenol in its oxime form which may be exemplified as:

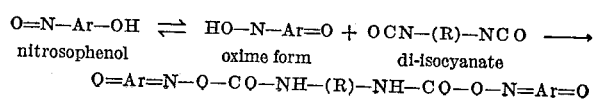

where Ar is an aromatic group, and R is that part of the di-isocyanate molecule which is other than the isocyanate groups.

These di- and poly-urethanes are the subject of our British patent specification No. 1,255,647.

The di-urethane thus formed is believed to subsequently decompose at an elevated temperature (in the same way as Hylene MP) to give the nitrosophenol and the di-isocyanate which then vulcanize the rubber. We have found that 140° C. to 180° C., dependent on structure, is normally sufficient to decompose the diurethane, and that cure may be conveniently effected by heating the mix for 30 minutes at a temperature in this range.

The use of a pre-reaction product of this kind is expected to release the two cross-linking reagents in the rubber mix in stoichiometric amounts. However, we find that the use of additional di-isocyanate in conjunction with these pre-reaction products not only leads to an increase in cross-linking efficiency, but also substantially improves the adhesion of the cured rubber to the other material. The proportion of diurethane added to the rubber will depend on the degree of cure required, and can quite readily be determined by methods known in the art. Proportions will generally be within the range 1 to 15, preferably from 2 to 10, parts by weight per 100 parts of dry rubber. When an excess of di-isocyanate is used, the proportion will preferably be up to 8, most preferably from 2 to 6, parts by weight per 100 parts of dry rubber.

Instead of using a pre-reaction product which releases stoichiometrically equivalent amounts of the nitroso compound and the isocyanates, it is possible to use a pre-reaction product which releases more isocyanate groups than aromatic nitroso molecules. Such pre-reaction products are described and claimed in our United States patent application No. 862,507, now U.S. Pat. No. 3,645,980. They are compounds having the general formula:

$$R(.NH.CO.O.N=Q=O)_m(.NCO)_n(.NH.C.Y.X)_p$$

where $M \gg 1$, $n \gg 0$, $p \gg 0$ and $(n+p) \gg 1$,
Q is an aromatic group in the quinonoid form,
R is an aromatic or saturated aliphatic group having a functionality of $(m+n+p)$,
Y is an oxygen atom and X is an aromatic or saturated aliphatic group, or
YX is an aromatic or saturated aliphatic substituted amino group.

These urethanes may conveniently be prepared from di- or poly-isocyanates having the formula $R(.NCO)_{m+n+p}$.

The group $(.NH.CO.O.N=Q=O)$ may be formed by the reaction of an isocyanate group with a nitroso-phenol, as explained above and as more fully described in our British patent specifications 1,255,646 and 1,255,647.

The group $(.NH.CO.Y.X)$ may be formed by the reaction of an isocyanate group with a molecule containing a hydroxyl group or a primary or secondary amino group. The reaction is of a kind which is well known, and may be represented thus:

$$R.NCO + HOX \rightarrow R.NH.CO.O.X$$
$$R.NCO + H_2NX \rightarrow R.NH.CO.NH.X$$
$$R.NCO + HNXX' \rightarrow R.NH.CO.NXX'$$

where R and X are as defined above and X' is an organic group whose nature is unimportant provided that it does not inhibit the reaction.

Two classes of compound within the broad definition set out above are as follows:

(A) $m \gg 1$, $n \gg 1$, $p=0$. This class is exemplified by the isocyanatourethane formed from a di-isocyanate and a nitrosophenol.

$$O=N-C_6H_4-OH \rightleftharpoons HO-N=C_6H_4=O$$
$$+OCN-R-NCO \rightarrow OCN-R-$$
$$NH.CO.O.N=C_6H_4=O$$

These isocyanatourethanes decompose reversibly at elevated temperatures to yield the starting materials. It is believed that the application of heat decomposes the isocyanatourethane, with the formation of the nitrosophenol which reacts with the rubber chains, and of di-isocyanate which then cross-links pendent amino or hydroxyl groups in the resulting product.

(B) $m=1$, $n=0$, $p \gg 1$, Y is oxygen, X is an aromatic group. These are products which may be formed by reacting a di- or poly-isocyanate with a phenol and with a nitrosophenol or substituted nitrosoaniline.

While the free nitroso compound is expected to be liberated at about 120° C., the difunctionality of the isocyanate will not be achieved until higher temperatures are reached, so that Mooney scorch at 120° C. will be considerably longer than with the isocyanatourethanes described above. They may be regarded as blocked analogues of the isocyanatourethanes in class A above which contain free isocyanate groups.

The pre-reaction products described in our United States patent application No. 862,507 can be used in the method of the present invention either with or without added di- or poly-isocyanate. If extra isocyanate is added, the proportion can be quite small, preferably less than 6% by weight on the weight of the rubber.

Adhesion of the material to the rubber may be improved if the material has been previously dipped in a di- or poly-isocyanate, or in a solution of a diurethane or an isocyanatourethane, the solvent then being driven off by heat. We prefer to stand the material in the liquid for a substantial length of time, e.g., overnight. The thus dipped material does not need to be heat-treated.

The following examples illustrate the invention. Parts and percentages are by weight unless otherwise stated:

EXAMPLES 1 TO 13

Various rubber formulations were cured under pressure in a cylindrical mould (25 mm. long by 17 mm. diameter) with cords of the test material running diametrically through the cylinder perpendicular to the axis. Bond strengths (kg. load) between cord and rubber vulcanizate were measured by a simple pull-out test. The results are given in Table I below.

Four types of cord were used, three being products of I.C.I. Limited: Nylon Type 049, Polyester Type 790, Polyester Type T, and rayon of unknown origin. The cords supplied were either untreated (U) or had been dipped and heat-treated (H). For nylon and rayon, a resorcinol-formaldehyde resin/styrene - butadiene - vinyl-pyridine latex (RFL) dip had been used; for polyester, a Pexul (I.C.I. Limited) dip.

In some cases, where indicated, the untreated cord was dipped in a di- or poly-isocyanate for 16 hours at room temperature before the samples were prepared.

The rubber formulations used were:

|  | Sulphur system | Urethane system A | Urethane system B |
|---|---|---|---|
| Natural rubber (SMR 5) | 100 | 100 | 100 |
| High-abrasion furnace black | 50 | 50 |  |
| Fine extrusion furnace black |  |  | 40 |
| Processing oil (Dutrex R) | 4 | 4 |  |
| Pine tar |  |  | 1.5 |
| Coumarone resin |  |  | 1.5 |
| Zinc oxide | 5 |  |  |
| Zinc oxide | 5 |  |  |
| Stearic acid | 3 |  |  |
| Sulphur | 2.5 |  |  |
| N-t-butylbenzothiazole-2-sulphenamide (Monsanto's Santocure NS) | 0.5 |  |  |
| Antioxidant (Monsanto's Santoflex 13) | 2 |  |  |
| Caloxol C31 (J. and E. Sturge Ltd.) |  | 5 | 5 |
| Zinc dimethyldithiocarbamate |  | 2 | 2 |
| Di-isocyanate |  | (*) | (*) |
| Urethane |  | (*) | (*) |

*As shown.

Vulcanizates were transfer-moulded under a pressure of 0.5 ton/cm.² in all cases. Vulcanization was for 20 minutes at 140° C. for Examples 1–9, 45 minutes at 150° C. for Example 10, 60 minutes at 150° C. for Example 11, 20 minutes at 150° C. for Example 12, and 50 minutes at 150° C. for Example 13.

the cords were untreated in any way. It will be appreciated that elimination of the pretreatment step offers a substantial economic advantage in commercial production. Also, it should be noted that many of the bond strengths obtained according to the invention exceed those obtainable using a conventional sulphur curing system, even with

TABLE I

| Example | A | B | C | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| Vulcanizing system (parts per 100 parts of rubber by weight in brackets) | Sulphur system | | | | | | | Urethane system A | | | | | | | Urethane system B | |
| Urethane | | | | DUTD (3.3) MDI (4) | DUTD (3.3) MDI (4) | DUW (3) HW (4) | DUTD (3.3) HW (3) | DUTD (3.3) HW (3) | DUTD (3.3) HW (3) | TUDR (3.85) DR (2.91) | IUTD (8) | IUTD (7) HW (1) | ICTD (10) | ICTD ² (11.7) | DUTD (3.3) HW (2.8) | ICTD (9.2) |
| Isocyanate | | | | | | | | | MDI (1.3) | | | | | | | |

Bond strengths (kg. load)

| Cord type | Treatment | None | TDI dip | DR dip | None | DR dip | None | None | DR dip | None | None | None | None | None | None | None | None |
|---|---|---|---|---|---|---|---|---|---|---|---|---|---|---|---|---|---|
| Nylon 049 | U | 3.8 | 4.0 | 5.8 | 6.8 | ᵇ11.3 | 10.1 | 11.8 | ᵇ11.2 | 9.9 | 8.0 | 9.7 | 9.4 | ᵇ13.3 | 6.4 | 12.3, 8.7 | 12.9, ᵇ13.4 |
| Polyester 790 | U | 3.85 | 5.2 | 5.3 | 8.05 | ᵇ10.5 | ᵇ13.8 | ᵇ14.9 | ᵇ10.3 | ᵇ13.4 | 10.5 | 10.2 | ᵇ13.1 | ᵇ14.4 | 9.8 | ᵇ14.4, ᵇ13.7 | 14.9, ᵇ14.4 |
| Polyester T | U | 4.8 | 5.0 | 4.7 | 5.35 | 8.9 | 6.5 | 6.9 | 10.6 | 6.9 | 7.0 | 6.4 | 7.6 | 8.0 | 6.4 | 4.6, 6.0 | 6.7, 6.8 |
| Rayon | U | 7.5 | | | 11.9 | | | 14.6 | | | | | | 12.6 | 10.8 | 6.0 | |
| Nylon 049 | H | 8.9 | | | 6.65 | | | | | | | | | ᵇ13.2 | 5.7 | 8.4, ᵇ12.6 | 5.2, ᵇ13.7 |
| Polyester 790 | H | 10.5 | | | 6.6 | | | | | | | | | 12.3 | 9.2 | 13.5, 9.0 | 12.7, ᵇ13.0 |
| Polyester T | H | 9.7 | | | 6.35 | | | | | | | | | 13.3 | 9.6 | 9.6, 12.7 | 12.4, ᵇ13.0 |
| Rayon | H | 12.0 | | | 9.6 | | 9.7 | | | | | | | 14.0 | ᵇ15.1 | | |

KEY.—Isocyanates:
ª Phenol blocked.
ᵇ Cord broke before adhesion failure.
TDI=Toluene-2,4-di-isocyanate.
MDI=Methylene-bis(4-phenylene)isocyanate).
HW=4,4'-di-isocyanatodicyclohexylmethane (Du Pont's Hylene W).
DR=4,4',4''-tri-isocyanatotriphenylmethane.
KEY.—Urethanes:
DUTD=Diurethane from 4-nitrosophenol and TDI.
IUTD=Isocyanatourethane from 4-nitrosophenol and TDI.
DUW=Diurethane from 4-nitrosophenol and HW.
TUDR=Triurethane from 4-nitrosophenol and DR.
ICTD=Isocyanatourethane from 3-methyl-4-nitrosophenol and TDI.

Examples A, B and C are based on a sulphur curing system and are included for comparison. Adhesion of rubber to untreated cord is poor, but conventional pretreatment substantially improves adhesion.

In Example 1, a urethane curing system is used. Conventional pretreatment of the cords does not improve adhesion. On the other hand, a polyisocyanate dip (Example 2) substantially improves adhesion.

Examples 3 to 7 illustrate various effective combinations of urethanes and isocyanates. Examples 8 to 11 illustrate the use of isocyanatourethanes and isocyanates. Examples 12 and 13 illustrate the use of urethane curing systems in combination with a pretreatment of the cords. Examples 12 and 13 illustrate the use of urethane curing systems in combination with a fine extrusion furnace black as filler.

EXAMPLE 14

Dipped or undipped woven nylon fabric was moulded so that it was covered with a sheet of compounded rubber on one side, a strip of vegetable paper being placed between the rubber and the fabric along one edge of the sheet to provide unbonded portions of the components for gripping the final test piece. Moulding pressure was controlled so that the rubber did not "strike" through the fabric. The moulded sheet was heated in a press under conditions to effect vulcanization of the rubber. Test pieces of 2.54 cm. width were cut from the bonded sheet, the unbonded portions were placed in the grips of an Instron tester (Model TM, Instron Limited), and the peel strength measured.

The following results were obtained:

| | Peel bond strength (kg./2.54 cm.) | |
|---|---|---|
| Cure system | Undipped woven nylon | Dipped woven nylon |
| Sulphur system | ᵃ 1.1 | ᵇ 12.0 |
| Urethane system (ICTD, 10 phr.) | ᶜ 6.4 | ᶜ 7.4 |

ᵃ 100% bond failure.
ᵇ 90% bond failure.
ᶜ 98% bond failure.

EXAMPLES 15 TO 21

The test method of ASTM D 429 (Method C) was used. In this method, rubber is bonded to two conical metal end-pieces and the axial force required to separate them is measured. The metal cone surfaces are sand-blasted and cleaned with a chlorinated solvent before use. Bonding agents may be applied to the cleaned cone surfaces if desired.

The results are given in Table II below.

They show that diurethane/di-isocyanate combinations or phenol-blocked isocyanatourethanes used as vulcanizing agents afford some degree of bonding to steel, the degree depnding on the actual reagents used and on the treatment of the mix prior to vulcanization. In some cases the degree of bonding reaches or exceeds that given by conventional bonding agents.

TABLE II
(Rubber-to-steel bonding with conical specimen (ASTM D 429, Method C))

| Example | Cure system | Cure conditions Time (min.) | Cure conditions Temp. (° C.) | Bonding agent | Bond strength (kg.) | Type of failure |
|---|---|---|---|---|---|---|
| C | Sulphur | 40 | 150 | | 34 | Bond (100). |
| D | do | 40 | 150 | Chemlok 220 ᵃ | 163 | Rubber/bond (98/2.) |
| 15 | Phenol-blocked ICTD (11.7) | 80 | 150 | | 67 | Bond (100). |
| 16 | do | 80 | 150 | DR | 119 | Rubber/bond (50/50). |
| 17 | (DUTD (4.0)) (DR (3.9)) | 20 | 140 | | 71 | Rubber/bond (4/96). |
| 18 | (DUTD (4)) (HW (4)) | 20 | 140 | | 115 | Bond (100). |
| 19 | (DUTD (4)ᵇ) (HW (4)) | 20 | 140 | | 97 | Do. |
| 20 | (DUTD (4)) (HW (6)) | 20 | 140 | | 118 (94, 134, 127) | Rubber/bond (20/80). |
| 21 | (DUTD (4) ᵇ) (HW (6)) | 20 | 140 | | 195 (164, 172, 248) | Rubber/bond (60/40). |

ᵃ Trademark of Hughson Chemical Company.
ᵇ Mix stored in polythene bag for 2-4 days before curing.

We claim:

1. A method of effecting adhesion between a natural or synthetic rubber having an unsaturated carbon chain and another material selected from the group consisting of natural and synthetic fibre-forming materials, and steel, which method is characterized by heating an intimate mixture of the rubber with:
   (a) an aromatic nitroso compound having the formula X—Ar—NO, where X is a hydroxyl or a primary or secondary amino group and Ar is an aromatic group, or a precursor thereof, and
   (b) an organic di- or poly-isocyanate, or a precursor thereof, under pressure in contact with the material to which it is to be adhered, so as to:
      (i) react the rubber with the aromatic nitroso compound, and
      (ii) react pendent amino or hydroxyl groups in the resulting product with the di- or poly-isocyanate so as to cross-link the rubber and effect adhesion between the rubber and said other material.

2. A method as claimed in claim 1, wherein the said other material is cellulose, rayon, polyamide, polyester or steel in the form of cord or fabric or a continuous solid surface.

3. A method as claimed in claim 1, wherein the said other material is pre-treated by being dipped in a di- or poly-isocyanate.

4. In a method of vulcanizing natural or synthetic rubber having an unsaturated carbon chain by heating a mixture of the rubber and vulcanizing ingredients at a temperature and pressure and for a time to vulcanize the rubber,
   the improvement which consists in effecting adhesion of the rubber with another material selected from the group consisting of natural and synthetic fibre-forming materials and steel in the form of cord or fabric or a continuous solid surface by providing said other material in contact with the rubber during vulcanization thereof, and by using as vulcanizing ingredients:
   (a) from 1 to 15 parts by weight, per 100 parts by weight of rubber, of a urethane pre-reaction product formed from a nitrosophenol and an organic di- or poly-isocyanate, and
   (b) from 0 to 8 parts by weight, per 100 parts by weight of rubber, of a di- or poly-isocyanate.

5. A method of effecting adhesion between a natural or synthetic rubber having an unsaturated carbon chain and another material selected from the group consisting of natural and synthetic fiber-forming materials, and steel, which method is characterized by heating an intimate mixture of the rubber with:
   a pre-reaction product of a nitrosophenol with a di- or poly-isocyanate, which pre-reaction product is used in an amount of from 1 to 15 parts by weight per 100 parts by weight of rubber, under pressure in contact with the material to which it is to be adhered, so as to:
      (i) react the rubber with the aromatic nitroso compound, and
      (ii) react pendent hydroxyl groups in the resulting product with the di- or poly-isocyanate so as to cross-link the rubber and effect adhesion between the rubber and said other material.

6. A method as claimed in claim 5, wherein the preretction product is derived from one molecule of nitrosophenol per isocyanate group.

7. A method as claimed in claim 5, wherein the pre-reaction product is derived from less than one molecule of nitrosophenol per isocyanate group.

8. A method as claimed in claim 5, wherein at least part of the di- or poly-isocyanate in the mixture with the rubber is provided in the form of the pre-reaction product with the nitrosophenol, further di- or poly-isocyanate being included in the mixture in a proportion of from 0 to 8 parts by weight per 100 parts by weight of rubber.

9. A method according to claim 5 wherein the isocyanate employed is a diisocyanate.

References Cited

UNITED STATES PATENTS

| | | | |
|---|---|---|---|
| 3,645,980 | 2/1972 | Baker et al. | 260—94.7 A |
| 2,835,624 | 5/1958 | Cousins | 156—331 |
| 3,598,690 | 10/1971 | Danielson | 156—331 |
| 2,690,780 | 10/1954 | Cousins | 117—161 A |
| 3,258,388 | 6/1966 | Coleman, Jr. et al. | 156—331 |
| 3,258,389 | 6/1966 | Coleman et al. | 156—331 |

FOREIGN PATENTS 924,814   5/1963   Great Britain.

DANIEL J. FRITSCH, Primary Examiner

U.S. Cl. X.R.

117—162, DIGEST 7; 156—110 A, 308, 331